(12) United States Patent
Watte et al.

(10) Patent No.: US 7,862,245 B2
(45) Date of Patent: Jan. 4, 2011

(54) OPTICAL FIBRE CONNECTOR

(75) Inventors: Jan Watte, Grimbergen (BE); Jacob Arie Elenbaas, Heyningen (NL); Peter Eyckmans, Lummen (BE); Luiz Neves Mendes, Begijnendijk (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 509 days.

(21) Appl. No.: 11/597,734

(22) PCT Filed: May 17, 2005

(86) PCT No.: PCT/GB2005/001886

§ 371 (c)(1), (2), (4) Date: Nov. 27, 2006

(87) PCT Pub. No.: WO2005/119318

PCT Pub. Date: Dec. 15, 2005

(65) Prior Publication Data

US 2008/0273838 A1    Nov. 6, 2008

(30) Foreign Application Priority Data

May 28, 2004 (GB) .................... 0412003.6

(51) Int. Cl.
*G02B 6/26* (2006.01)
*G02B 6/36* (2006.01)

(52) U.S. Cl. .................. 385/99; 385/95; 385/98
(58) Field of Classification Search .................. 385/99
See application file for complete search history.

(56) References Cited

U.S. PATENT DOCUMENTS

| 4,087,157 | A | | 5/1978 | Hodges |
| 4,149,771 | A | | 4/1979 | Epworth et al. |
| 4,470,180 | A | | 9/1984 | Blomgren |
| 5,121,456 | A | * | 6/1992 | Essert et al. .................. 385/70 |
| 5,963,699 | A | * | 10/1999 | Tanaka et al. .................. 385/97 |
| 5,984,532 | A | * | 11/1999 | Tamaki et al. .................. 385/70 |
| 6,193,421 | B1 | * | 2/2001 | Tamekuni et al. .............. 385/65 |

FOREIGN PATENT DOCUMENTS

| DE | 38 09 036 A1 | 9/1989 |
| DE | 38 09 037 A1 | 9/1989 |
| EP | 0 290 188 A2 | 11/1988 |
| EP | 0 384 678 A2 | 2/1990 |
| EP | 0 846 965 A1 | 6/1998 |
| EP | 0 886 155 A2 | 6/1998 |
| JP | 10-048451 A | 2/1998 |
| JP | 10048451 A * | 2/1998 |

OTHER PUBLICATIONS

International Search Report for International Application No. PCT/GB2005/001886 dated Jul. 29, 2005 issued by the European Patent Office.
Search Report for Priority Application No. GB0412003.6 dated Oct. 5, 2004 issued by The Patent Office.

* cited by examiner

*Primary Examiner*—Michelle R Connelly Cushwa
(74) *Attorney, Agent, or Firm*—Baker & Daniels LLP (57) ABSTRACT

An optical fiber connector for forming a mechanical splice between first and second optical fibers comprises a connector body arranged to clamp the optical fibers therein, wherein the connector body is configured to be at least partially opened to release, or to allow insertion of, at least one of the optical fibers by a squeezing action applied to the connector body.

7 Claims, 5 Drawing Sheets

29  125 μm section a-a

Fig.6(b).

5  125 μm section b-b

Fig.6(c).

250 μm section c-c

Fig.6(d).

250 μm section d-d

Fig.6(e).

900 μm section e-e  3

Fig.6(f).

5  900 μm section d-d

OPTICAL FIBRE CONNECTOR

The present invention relates to optical fibre connectors for forming mechanical splices between optical fibres.

There is a wide variety of designs of optical fibre connector for forming mechanical splices (i.e. splices in which the fibres are spliced together by mechanical means). An example of one type of mechanical splice connector is disclosed in U.S. Pat. No. 5,963,699. This document discloses optical fibre mechanical splice connectors comprising a base and a lid between which spliced optical fibres are clamped, by means of an external spring clamp that holds the base and the lid together. The lid is formed from three separate sections, i.e. a single middle section for clamping both stripped bare portions of the spliced fibres, and two end sections for clamping each of the two coated fibre portions. The spring clamp is divided into three sections corresponding to the three sections of the lid, so that the clamping force can be adjusted for each lid section independently of the other sections. The lid and the base of the connector may be opened partially to allow the optical fibres to be inserted or removed from the connector, by means of a wedge inserted into wedge insertion openings provided between the lid and the base.

A first aspect of the present invention provides an optical fibre connector for forming a mechanical splice between first and second optical fibres, the connector comprising a connector body arranged to clamp the optical fibres therein, wherein the connector body is configured to be at least partially opened to release, or to allow insertion of, at least one of the optical fibres by a squeezing action applied to the connector body.

Preferably the connector body comprises at least two clamping parts arranged to clamp the optical fibres between them. Advantageously, the clamping parts are configured such that the squeezing action that at least partially opens the connector body does so by pushing the clamping parts away from each other.

In preferred embodiments of the invention, each of the clamping parts includes at least one portion that is accessible through or across the other clamping part to allow the clamping part with that portion to be pushed away from the other clamping part.

Accordingly, a second aspect of the invention provides an optical fibre connector for forming a mechanical splice between first and second optical fibres, the connector comprising a connector body that comprises at least two clamping parts arranged to clamp the optical fibres between them, wherein each of the clamping parts includes at least one portion that is accessible through or across the other clamping part to allow the clamping part with that portion to be pushed away from the other clamping part thereby at least partially opening the clamping parts.

At least one of the portions of the clamping parts preferably includes an extension extending at least partially through or across the other clamping part to assist the access to that portion.

The clamping parts preferably divide the connector body into at least two parts along at least part of a length thereof, arranged such that the optical fibres may be clamped between the clamping parts. The clamping parts may conveniently be designated "base" and "lid" parts of the connector body.

Preferably the connector further comprises a resilient clamp member arranged to retain the optical fibres in a clamped condition in the connector body. Advantageously, the resilient clamp member may be arranged to be retained on the exterior of the connector body. The connector body may be arranged to retain the parts of the connector body together such that the optical fibres are clamped between the parts of the connector body.

The present invention, as explained below, enables the provision of optical fibre connectors that have major advantages over the known connector described above, including:

(i) a reduction in the opening force required to open the connector slightly in order to release, or to allow insertion of, at least one of the optical fibres;

(ii) "half-installability", i.e. the ability to install a first optical fibre (or a first set of optical fibres) in a mechanical splice connector, and to install a second optical fibre (or a second set of fibres) to be spliced with the first fibre(s) at a later time;

(iii) the ability to close a "half-installed" mechanical splice connector such that the interior of the connector and the installed optical fibre(s) are protected, until the second optical fibre(s) is/are spliced;

(iv) the ability to clamp the first optical fibre(s) against movement in the x, y, or z directions, and also against rotation, even while the second optical fibre(s) is/are spliced to the first fibre(s)—which enables the orientation of an angled cleaved end face of the (or each) first fibre to be fixed for subsequent splicing with a second fibre;

(v) the ability of a single mechanical splice connector to accommodate different diameters of optical fibre, for example both 250 µm diameter coated fibre and 900 µm diameter coated fibre; and (vi) the versatility of a mechanical splice connector either not to include a means of precisely aligning the spliced optical fibres (where the numerical aperture of the fibres is such that no precise alignment is required), or to include any one of a variety of alignment means, to suit particular requirements.

Other advantages of the present invention will be apparent from the rest of this specification.

In preferred embodiments of the invention the connector comprises a connector body comprising at least two main clamping sections dimensioned to clamp directly onto the bare fibre of the first and second optical fibres, the main clamping sections arranged such that the first optical fibre may be clamped by a first of the main clamping sections independently of the second optical fibre, enabling the clamping of the first fibre against rotational and axial movement with respect to the connector body to remain substantially undisturbed by subsequent clamping or unclamping of the second fibre.

By "bare optical fibres stripped of coatings" is generally meant that end portions of the fibres to be spliced are stripped of coatings, or merely that the fibres (or at least their end portions) substantially lack coatings. The stripped coatings generally comprise primary coatings and/or buffer coatings.

The preferred configuration of the connector for the purpose of partially opening the connector, and the preferred method of partially opening the connector (in order to insert or remove optical fibres), which are the main aspects of the present invention, will now be explained.

The clamping parts of the connector body each preferably include respective extensions (as referred to above), which will be termed "teeth portions", to facilitate the partial opening of the connector. The teeth portions preferably are spaced apart from each other along at least part of the length of each clamping part. In each case, the teeth portions preferably are situated on one side of the respective clamping part (e.g. base or lid) and extend from that side in a direction perpendicular to a clamping surface of the clamping part, which clamping surface is arranged to be brought together with a respective surface of the other clamping part to clamp optical fibres between them. In particular, the teeth portions preferably extend from the side of their respective part beyond the respective clamping surface. Also, the teeth portions preferably are arranged such that when the two clamping surfaces are brought together and the connector is closed, the teeth portions of the two clamping parts fit between or adjacent to each other on the same side of the connector body. In this way, the teeth portions of each respective part (e.g. base or lid) extend across the other respective part (lid or base.

In an alternative but equivalent arrangement, the connector is configured such that the teeth portions of one of the clamping parts (i.e. the base or the lid) extend partially through (rather than across) the other clamping part (i.e. the lid or the base, respectively).

In order partially to open a particular clamping section of the connector, for example in order to insert or to remove an optical fibre, an action that amounts to a squeezing action advantageously is performed on the teeth portions (extensions) of that clamping section, e.g. the teeth portions of the base part and the teeth portions of the lid part, are, in effect, squeezed towards each other. This squeezing action causes the clamping parts to be pushed away from each other, thereby partially opening the connector.

The present invention also provides a device for opening connectors according to the invention. In order to open a clamping section of a connector by means of the squeezing action described above, the connector preferably is inserted into the device such that the teeth portions of one (only) of the clamping parts of the connector abut against a ram surface of the device. A ram member of the device preferably is movable along at least part of the length of the inserted connector on the opposite side thereof to the ram surface, until it is in registration with the tooth portion (or teeth portions) of the relevant clamping section of the other clamping part of the connector. The ram member is then actuated to push such tooth portion (or teeth portions) towards the ram surface. The effect, therefore, is to apply the squeezing action described above, thereby partially opening the clamping section of the connector to allow the insertion or removal of an optical fibre.

As indicated above, the invention provides a mechanical splice connector preferably that enables a first optical fibre to be fixed in the connector, and a second optical fibre to be spliced with the first fibre at a subsequent time, without the first fibre being disturbed. This may be required, for example, so that the major parts of an optical fibre network may be deployed, and subscribers subsequently connected to the network as and when required. One example of why it may be important not to disturb the first fibre when the second fibre is spliced with it, is that the end face of the first fibre may have been cleaved at an angle with respect to the perpendicular (from its longitudinal axis) in order to prevent or at least minimize undesirable reflections back along the fibre from the end face (which may disrupt the transmission of data in the network). A great advantage of the present invention is that it can facilitate the mechanical splicing of a first fibre with a second fibre by maintaining the rotational orientation of an angled end face of the first fibre in the mechanical splice connector, and avoiding the need to disturb such orientation when the second fibre is introduced.

This feature of the invention enables the clamping of the first fibre to remain substantially undisturbed by subsequent clamping or unclamping of the second fibre because the main clamping sections (which are dimensioned to clamp directly onto both bare optical fibres) comprise at least two sections arranged such that the first fibre may be clamped by a first of the sections independently of the second fibre. The connectors disclosed in U.S. Pat. No. 5,963,699 do not have this advantage because the middle section of the lid of those connectors comprises only a single section dimensioned to clamp both of the bare fibres. Consequently, in order to clamp or unclamp a second fibre subsequently to the clamping of a first fibre, it would be necessary to unclamp the first fibre from the middle section of the lid of such a connector. Now, although the connectors disclosed in U.S. Pat. No. 5,963,699 also include separate end sections that independently clamp the coated portions of the fibres (and which are not dimensioned to clamp directly onto the bare fibre stripped of coatings), the problem of the unclamping of the first fibre is still not solved, because it is a fact that an optical fibre clamped only by its outer coating (and not clamped directly onto the central bare fibre itself) is generally able to rotate about its axis. Consequently, the connectors disclosed in U.S. Pat. No. 5,963,699 are not generally able to preserve the rotational orientation of a first installed fibre when a second fibre is added to, or removed from, the connector.

As described below, the connectors according to the present invention may (and preferably do) include additional independent end clamping sections arranged to clamp the coated sections of the fibres. The two or more main clamping sections arranged to clamp the bare fibres categorically are not equivalent to such additional clamping sections of the present invention or of the prior art.

As indicated above, in addition to the two or more main clamping sections configured to clamp directly onto the bare fibre of the first and second stripped optical fibres, the connector body preferably includes at least one, and preferably at least two, additional clamping sections dimensioned/configured and arranged to clamp onto coated portions of the optical fibres, i.e. portions of the fibres from which the coatings have not been stripped.

In particularly preferred embodiments of the invention, the connector body comprises at least four clamping sections configured to clamp the first and second optical fibres, the clamping sections arranged such that the first optical fibre may be clamped by at least one of the clamping sections independently of the second optical fibre, enabling the clamping of the first fibre against rotational and axial movement with respect to the connector body to remain substantially undisturbed by subsequent clamping or unclamping of the second fibre. Preferably at least two of the clamping sections are the main clamping sections referred to above. At least one, but preferably at least two, of the clamping sections are the preferred additional clamping sections referred to above.

In especially preferred embodiments of the invention, the connector comprises at least five clamping sections.

The connector may include at least three main clamping sections configured to clamp directly onto bare optical fibre. A first of the main clamping sections may be arranged to clamp onto the first fibre only, a second of the main clamping sections may be arranged to clamp onto the second fibre only, and a third of the main clamping sections may be arranged to clamp onto both of the first and second fibres.

The connector body of the connector according to all aspects of the invention preferably includes at least one bore arranged to accommodate the optical fibres. Preferably, the main clamping sections and the bore of the connector body are configured to clamp the bare fibre of the first and second optical fibres in the bore. The (or each) bore preferably has a first region, and a second region of greater diameter than the first region at each end of the first region. More preferably, the bore has a third region of greater diameter than the second region at each end of the second region. Preferably at least the second and third regions of the bore are substantially circular in cross-section.

The connector body thus preferably includes a bore for accommodating the fibres, the bore having a first region, a second region of greater diameter than the first region at each end of the first region, and a third region of greater diameter than the second region at each end of the second region opposite to that adjacent to the first region, wherein at least the second and/or third regions of the bore are substantially circular in cross-section.

Optical fibres come in a range of diameters depending on the size of the coating applied to the bare fibre. For example, two standard sizes of optical fibre are 250 µm diameter and 900 µm diameter. 250 µm fibre is generally known as primary coated fibre (due to its relatively thin outer coating), and 900 µm fibre is generally known as buffer coated fibre (due to its relatively thick outer coating). The central fibre itself generally has a standard diameter irrespective of whether it is primary coated fibre or buffer coated fibre. A standard diameter for the bare fibre itself is 125 µm. Because optical fibres come in more than one size, it would be desirable to have a mechanical splice connector that could accommodate each size of fibre in one and the same device. This would avoid the need for a proliferation of different connectors for accommodating the different fibre sizes and the combinations of differently sized fibres to be spliced.

Preferably the first region of the bore of the connector is dimensioned to accommodate bare optical fibre stripped of its coatings (e.g. the bare fibre having a diameter of approximately 125 µm), and each second region preferably is dimensioned to accommodate primary coated optical fibre (e.g. the primary coated fibre having a diameter of approximately 250 µm). Preferably each third region is dimensioned to accommodate buffer coated optical fibre (e.g. the buffer coated fibre having a diameter of approximately 900 µm). Consequently, one and the same connector device may accommodate bare fibre, primary coated fibre, and/or buffer coated fibre. Preferably the second and third regions of the bore are dimensioned to accommodate coated optical fibres of different respective sizes. Consequently, by means of the second and third regions of the bore, the connector according to the invention fulfils the need for an optical fibre connector that can accommodate different sizes of optical fibre (due to the fibres having different thicknesses of coatings on the bare fibre) in one and the same connector device.

The connector preferably includes alignment means for aligning the first and second optical fibres with each other. Preferably the optical fibres are sufficiently aligned by the alignment means to form a splice that minimizes optical losses such that any losses are of an acceptable level. A preferred alignment means is a bore of the connector body, preferably as referred to above. The bore preferably is dimensioned such that the stripped bare portions of the first and second optical fibres form a tight fit within the bore. The bore may comprise a groove of the connector body, for example a V-groove or a U-groove, and/or it may comprise a substantially circular cross-section bore. Additionally, or alternatively, the alignment means may comprise an alignment member in which the first and second optical fibres may be received and aligned. The alignment member may include an alignment bore for receiving and aligning the optical fibres. The alignment member may, for example, comprise a tube (or the like), for example a capillary tube. The tube may be formed from glass, for example. Alternatively, the alignment member may comprise at least one plate, preferably a pair of plates, each of which has an aperture for receiving a respective one of the first and second fibres. One or both plates may include a lens (e.g. a micro-lens) to assist in coupling light between the fibres. The plates may be the same as, or similar to, the FIG. 13 embodiment of co-pending UK patent application number 0309908.2 filed on 30 Apr. 2003.

In some embodiments of the invention, the connector may include a plurality of ferrules or other fixing members, each of which is arranged to be fixed (e.g. crimped) to a respective optical fibre such that the ferrule or other fixing member is secured in the connector body when the fibres are spliced. Such ferrules or other fixing members may assist in retaining a desired rotational orientation of its respective fibre in the connector.

The connector according to the invention may advantageously be arranged to form mechanical splices between a plurality of first and second optical fibres (e.g. multiple fibre splices). The connector body may therefore comprise a plurality of bores arranged to accommodate the plurality of first and second optical fibres.

The lid and base parts of the connector body (of all embodiments of the invention) preferably are formed from polymer material, e.g. PPS. The resilient clamp member may be formed from the polymer or metal, but metal is generally preferred. Preferred metals include inox steel and beryllium copper. The ferrules (where present) preferably are formed from metal.

Some preferred embodiments of the invention will now be described, by way of example, with reference to the accompanying drawings, of which.

FIGS. 1 to 5 illustrate the components of a preferred optical fibre connector according to the invention. The connector 1 comprises a connector body comprising two parts 3 and 5 which divide the connector body in two along the length of the connector body. The two parts 3 and 5 may be regarded as half-shells of the connector body. The first part 3 will be designated as a base part 3, and the second part 5 will be designated as a lid part 5. The base part 3 is shown in detail in FIG. 3, and the lid part 5 is shown in detail in FIG. 4. Each of the parts 3 and 5 includes a longitudinal channel which, when the parts are brought together to close the connector body define a longitudinal bore 7 extending through the connector body. The bore 7 is for accommodating optical fibres (not shown) spliced in the connector in use.

The bore 7 comprises a longitudinally central first region 11, second regions 13 at each end of the first region 11, and third regions 15 at each end of the second region 13 (opposite to the ends adjacent to the first region 11). Each second region 13 has a greater diameter than the first region 11, and each third region 15 has a greater diameter than its adjacent second region 13. As described earlier in the specification, the first region 11 of the bore 7 is dimensioned to accommodate bare optical fibre stripped of coatings in a tight clamping fit when the lid part 5 and the base part 3 of the connector body are clamped tightly together. The bare optical fibre preferably has an external diameter of approximately 125 μm.

Figures 3, 4:
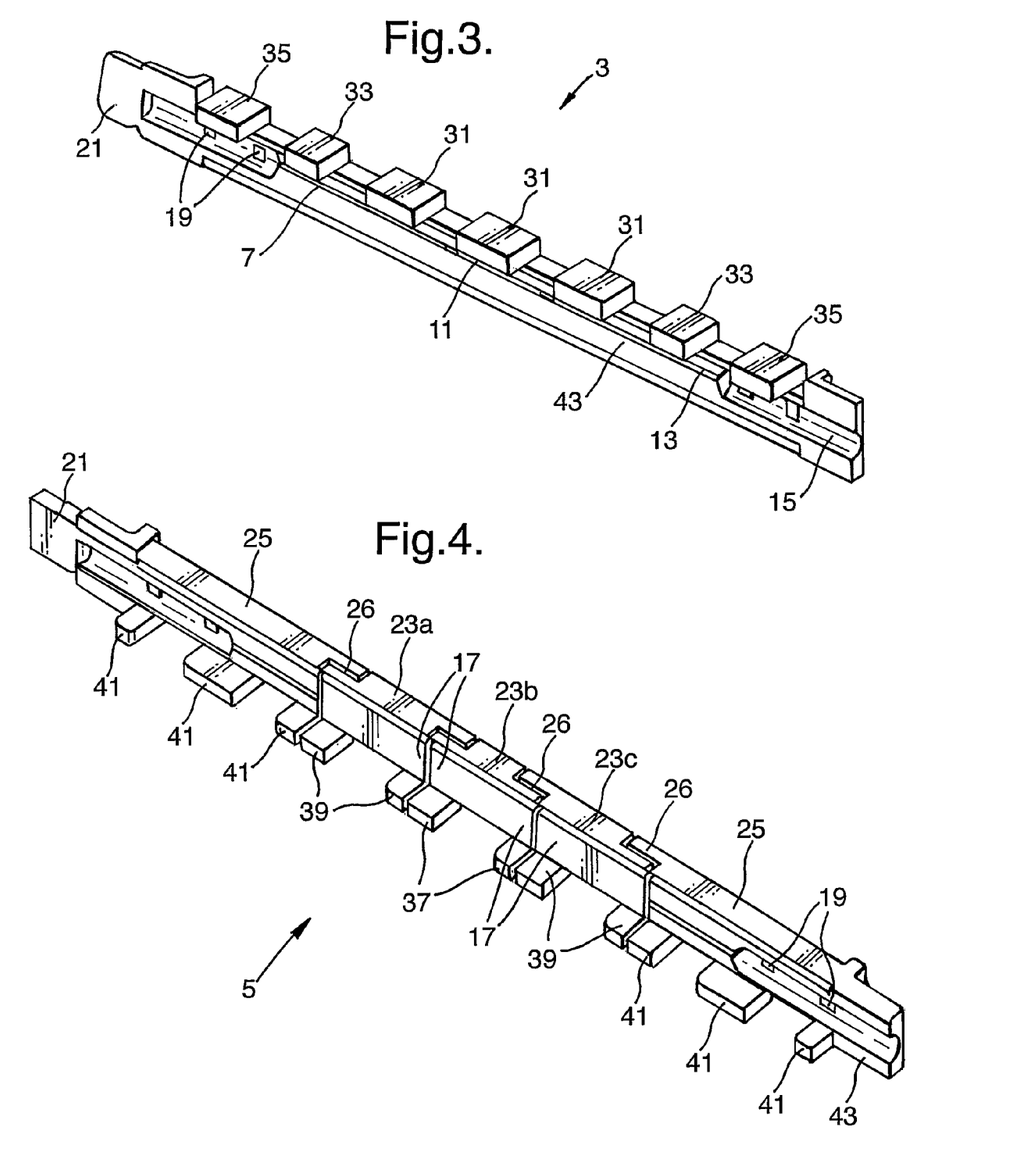
FIG. 3 illustrates a base part of the connector of FIGS. 1 and 2.
FIG. 4 illustrates a lid part of the connector of FIGS. 1 to 3.

As shown in FIG. 3, one of the parts of the connector body, preferably the base part 3, includes a semicircular cross-section channel as its portion of the first region 11 of the bore. The other part of the connector body, preferably the lid part 5 as shown in FIG. 4 preferably is substantially flat in its first region, other than small recesses 17 which help to guide and retain the fibres in position. The fact that the first region of the bore is not circular in cross-section but includes a flat section helps to clamp the bare fibre tightly in the first region. The second and third regions, however, preferably are substantially circular in cross-section, as shown in FIGS. 3 and 4.

One or both of the second and third regions may include one or more retaining members arranged to cut into the respective coating of the optical fibre to provide axial pull resistance, especially in order to counter creep which might otherwise occur over time. FIGS. 3 and 4 show retaining members 19 in the third regions 15 of the bore 7 of the base part 3.

As shown in FIGS. 1 to 4, the connector may include plugs (or dust caps) 21 arranged to close, and preferably to seal, the ends of the bore 7 prior to, and during, installation of the optical fibre splice. The plugs 21 preferably prevent dust or other dirt ingress into the connector, and preferably also water ingress into the connector, which could have a detrimental effect on the integrity of the splice. The plugs are removable to enable the optical fibres to be inserted.

Figures 1, 2:
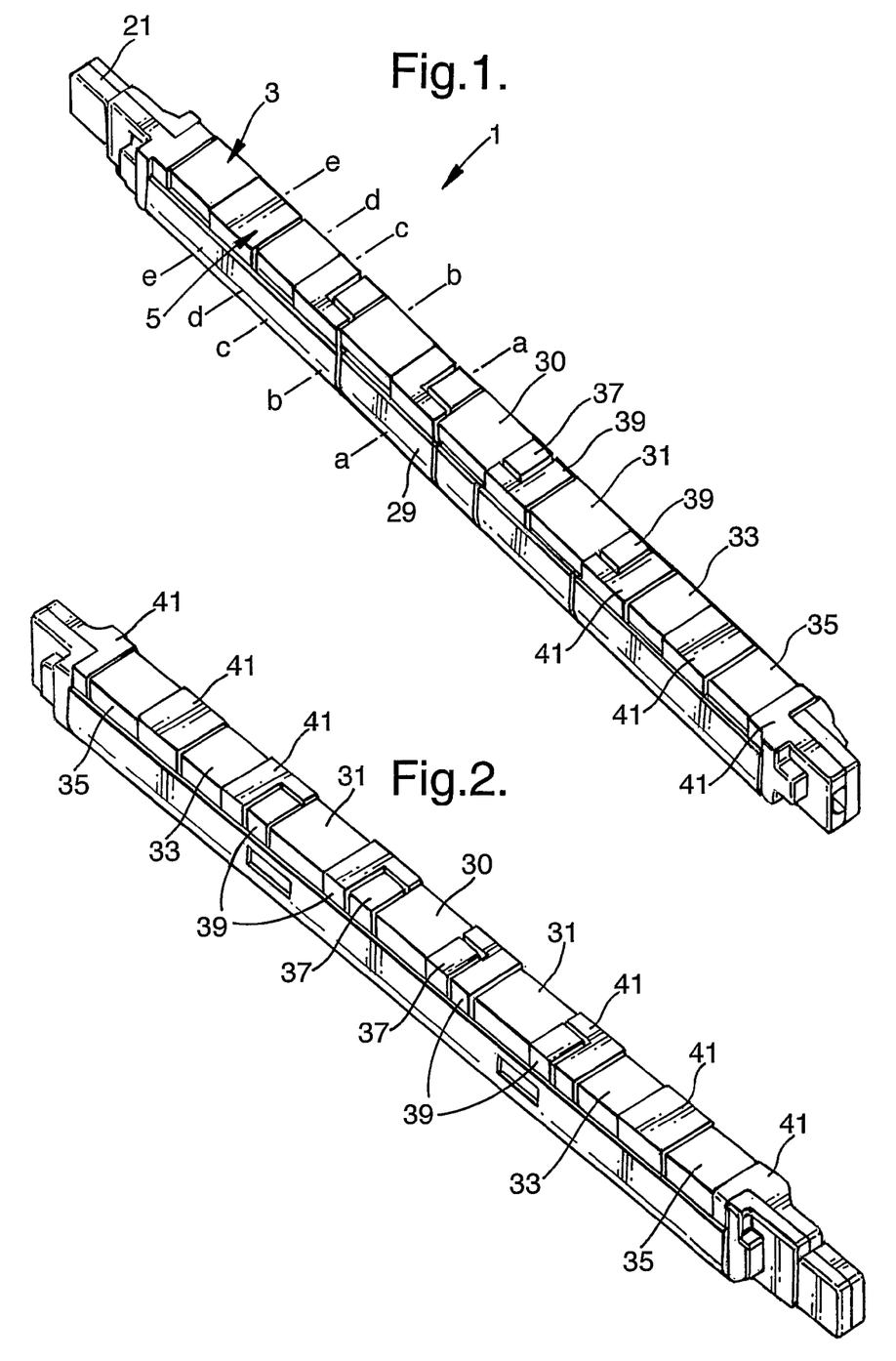
FIG. 1 illustrates a preferred optical fibre connector according to the invention.
FIG. 2 shows another view of the connector of FIG. 1.

As shown in FIGS. 1, 2 and 4, at least one of the parts of the connector body, preferably the lid part 5, is divided into a plurality of sections 23 and 25. The sections 23 and 25 are clamping sections of the connector body. As illustrated, there are five clamping sections, comprising three main clamping sections 23a, 23b and 23c arranged to clamp directly onto the bare optical fibre in the first region 11 of the bore 7, and two additional clamping sections 25 arranged to clamp directly onto the coated portions of the optical fibres in the second or third regions of the bore 7.

FIG. 4 illustrates how the clamping sections 23 and 25 are divided from each other along the length of the connector body. Each clamping section is separated from each adjacent clamping section by a gap 26, thereby enabling the clamping sections to move, and therefore clamp, independently of each other.

Figure 5:
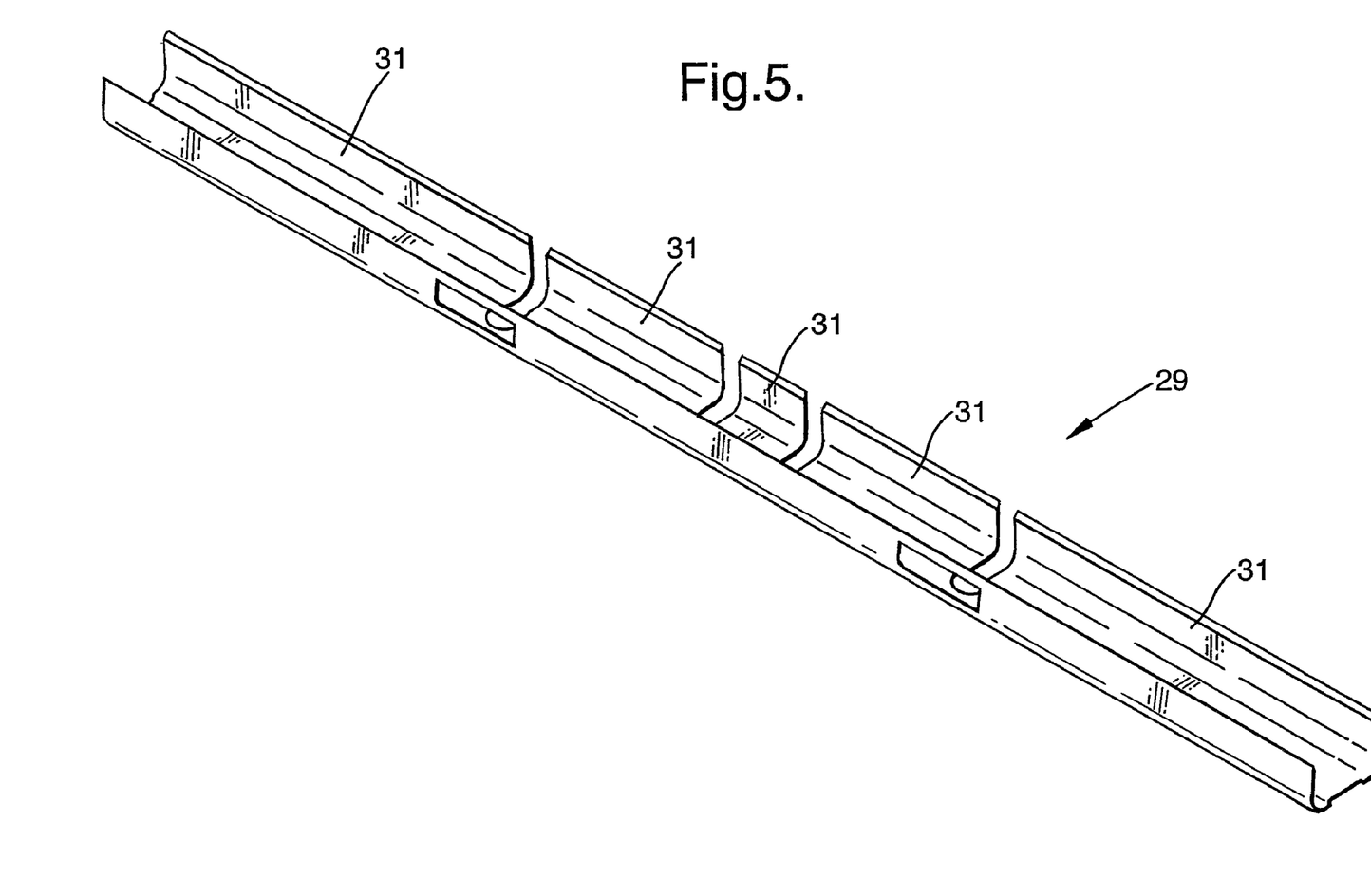
FIG. 5 illustrates a resilient clamp member of the connector of FIGS. 1 to 4.
Figure 6A:
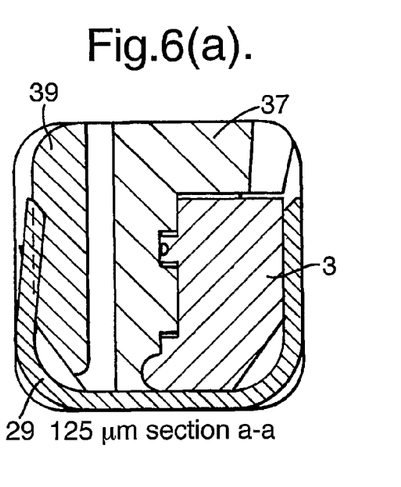
FIG. 6 illustrates various cross-sections through the assembled connector of FIGS. 6(*a*) through 6(*f*).
Figure 6B:
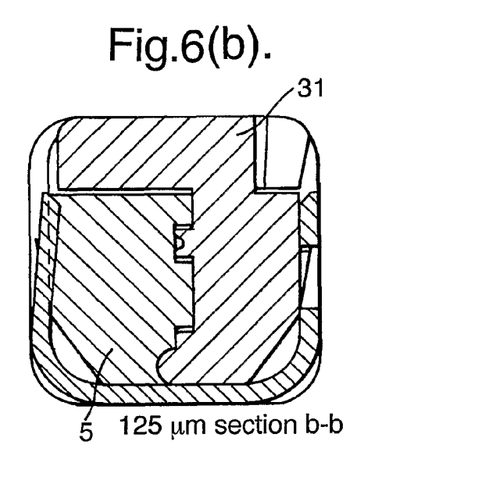
Figure 6C:
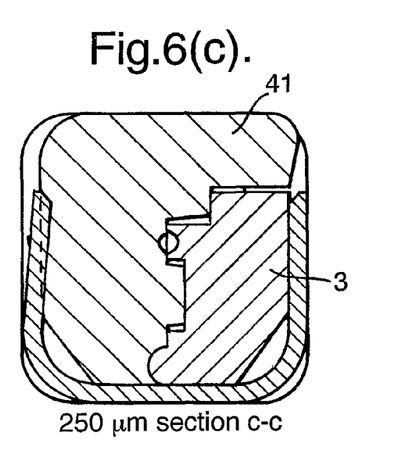
Figure 6D:
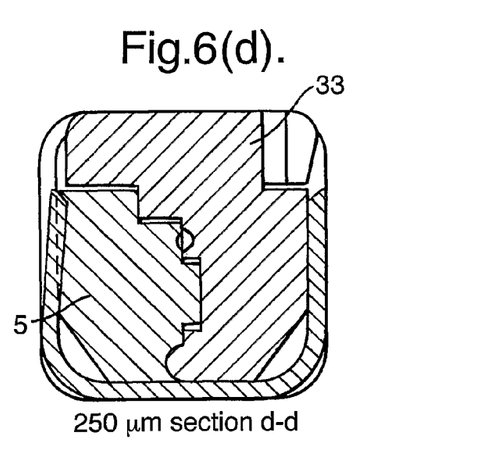
Figure 6E:
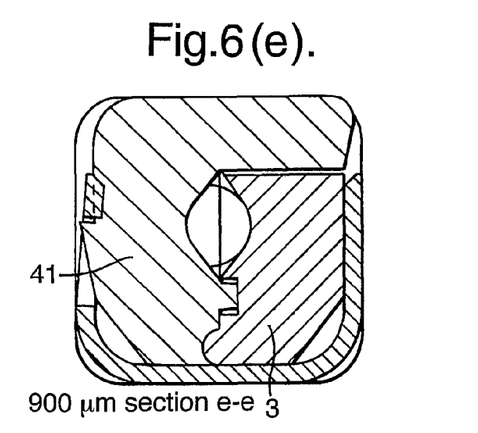
Figure 6F:
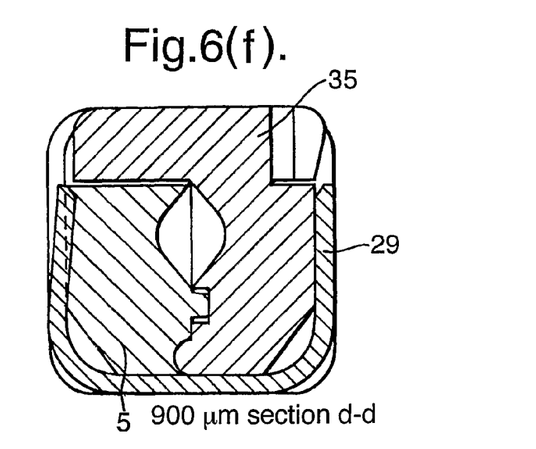

As shown most clearly in FIGS. 1, 2 and 5, the connector also includes a resilient clamp member 29 in the form of a generally U cross-section resilient metal member that is configured to be retained on the exterior of the connector body. The resilient clamp member 29 is arranged to retain the lid part 5 and the base part 3 together such that they are tightly clamped around the spliced optical fibres. One of the two generally parallel arms of the resilient clamp member is divided into clamping sections 31, which form part of the respective clamping sections 23 and 25 of the connector body. The clamping sections 31 of the resilient clamp member enable the clamping sections 23 and 25 of the connector to clamp the fibres independently of each other.

Because the connector body and the resilient clamp member include three separate main clamping sections arranged to coincide with the first region 11 of the bore 7, the stripped bare portions of two optical fibres spliced in the connector may be clamped independently of each other. Specifically, a first main clamping section 23a clamps only a first bare optical fibre, a second main clamping section 23b clamps both of the first and second bare optical fibres, and a third main clamping section 23c clamps only the second bare optical fibre. Consequently, a tremendous advantage of the invention (as described earlier) is that a first optical fibre may be installed in the connector body in preparation for splicing with a second optical fibre to be installed in the connector body at a later time. The end face of the first optical fibre preferably is cleaved at a non-perpendicular angle with respect to the longitudinal axis of the fibre, in order to minimise back reflections. As a way of facilitating the splicing of the fibre to a second fibre (also having a non-perpendicular end face) it is preferable to determine and to retain the orientation of the end face of the first fibre in the connector body. The fact that the second fibre can be introduced into the connector body and spliced with the first fibre without requiring the unclamping of the first main clamping section 23a from the first fibre means that the orientation of the first fibre is retained.

The connector disclosed as U.S. Pat. No. 5,963,699 does not have the above advantage because the bare fibre sections of both fibres are clamped by one and the same central clamping section of that connector. The fact that there are separate clamping sections which separately clamp the coated portions of the fibres does not assist in retaining the fibre orientation, because the clamping to the coating (rather than the bare fibre) generally does not fix the orientation of a fibre against rotation.

The preferred configuration of the connector for the purpose of partially opening the connector, and the preferred method of partially opening the connector (in order to insert or remove optical fibres), which are the main aspects of the present invention, will now be explained.

The base part 3 and the lid part 5 each include respective portions, which will be termed "teeth portions", to facilitate the partial opening of the connector. The base part 3 includes teeth portions 30, 31, 33 and 35, which are spaced apart from each other along most of the length of the base part. The lid part 5 includes teeth portions 37, 39 and 41, which are spaced apart from each other along most of the length of the lid part. In each case, the teeth portions are situated on one side of the respective part (base or lid) and extend from that side in a direction perpendicular to the surface 43 in which the bore 7 is provided (the two surfaces 43 being arranged to be brought together to define the bore 7 and to close the connector, in use). In particular, the teeth portions extend from the side of their respective part beyond the respective surface 43. Also, the teeth portions are arranged such that when the two surfaces 43 are brought together and the connector is closed, the teeth portions of the base and lid parts fit between or adjacent to each other on the same side of the connector body. In this way, the teeth portions of each respective part (base or lid) extend across the other respective part (lid or base), as shown in FIGS. 1 and 2.

FIG. 6 shows a series of six cross-sections through the assembled connector 1 of FIGS. 1 to 5. The respective cross-sectional planes are indicated in FIG. 1.

In order partially to open a particular clamping section of the connector, for example in order to insert or to remove an optical fibre, an action that amounts to a squeezing action is performed on the teeth portions of that clamping section, i.e. the teeth portions of the base part 3 and the teeth portions of the lid part 5, are, in effect, squeezed towards each other. This squeezing action causes the base part and the lid part to be pushed away from each other against the resilience of the clamp member 29, thereby partially opening the connector. For example, in order to open the clamping section 23a, a squeezing action is applied on the one hand to the respective teeth portions 39 of the lid part 5, and on the other hand to the respective tooth portion 31 of the base part 3. The directions of force applied to the teeth portions 39 and 31 are shown in FIG. 1. This squeezing action is shown schematically in FIG. 7. As drawn, the tooth portion 39 of the lid part 5 extends behind the tooth portion 31 of the base part 3. The forces applied to the teeth portions are indicated schematically by means of arrows and blocks 51.

Figure 7:
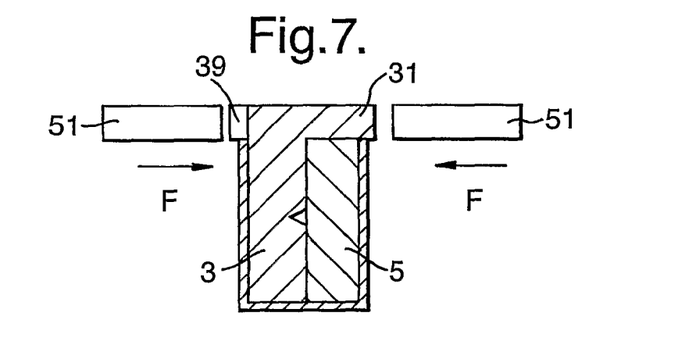
FIGS. 7 and 8 are schematic diagrams illustrating methods of opening the connector of FIGS. 1 to 5, enabling the insertion or removal of optical fibres into or from the connector.
Figure 8:
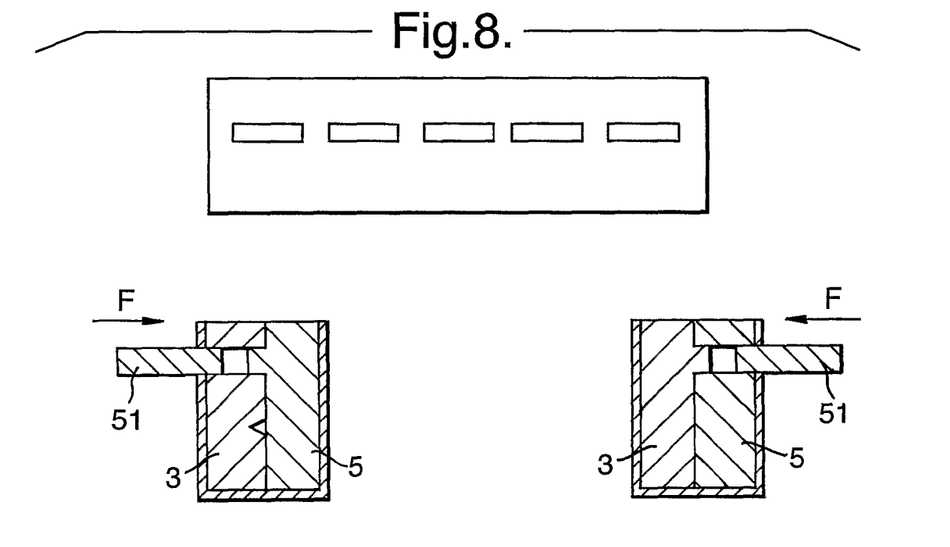

An alternative but equivalent arrangement to that shown in FIG. 7 is shown schematically in FIG. 8. In the FIG. 8 arrangement, the connector is configured such that the teeth portions of one of the clamping parts (i.e. the base or the lid) extend partially through (rather than across) the other clamping part (i.e. the lid or the base, respectively).

Figure 9:
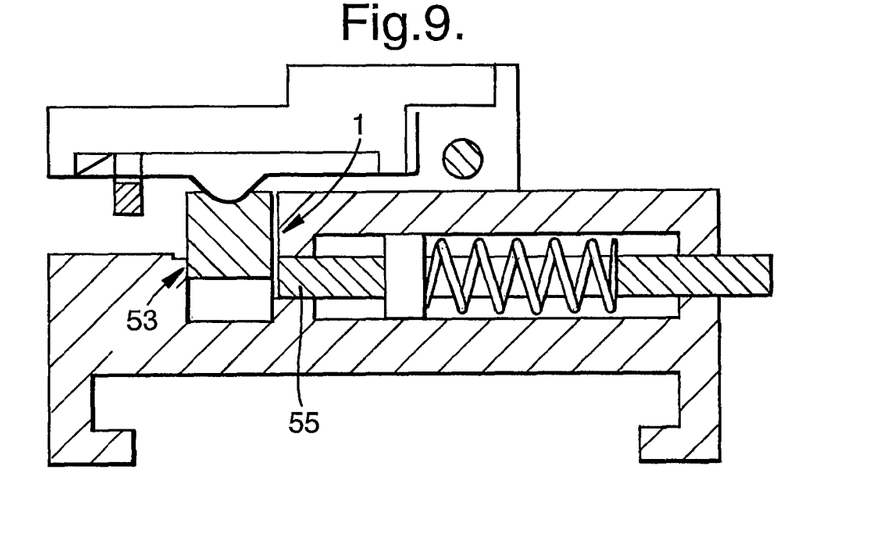
FIG. 9 is a schematic illustration of an example of a device for opening connectors according to the invention.

FIG. 9 is a schematic illustration of an example of a device for opening connectors according to the invention. In order to open a clamping section of a connector 1 by means of the squeezing action described above, the connector is inserted into the device such that the teeth portions of one (only) of the clamping parts of the connector (i.e. either the base part 3, or alternatively the lid part 5) abut against a surface 53 of the device. A ram member 55 of the device is movable along the length of the inserted connector on the opposite side thereof to the surface 53, until it is in registration with the tooth portion (or teeth portions) of the relevant clamping section of the other clamping part of the connector. The ram member 55 is then actuated to push such tooth portion (or teeth portions) towards the surface 53. The effect, therefore, is to apply the squeezing action described above, thereby partially opening the clamping section of the connector to allow the insertion or removal of an optical fibre.

The invention claimed is:

1. An optical fiber connector for forming a mechanical splice between first and second optical fibers, the connector comprising:
    a first clamping part having a first clamping surface;
    a second clamping part having a second clamping surface;
    a bore defined between the first and second clamping parts when the first and second clamping surfaces are abuttingly joined;
    a first extension portion extending from the first clamping part generally perpendicular to the first clamping surface;
    a second extension portion extending from the second clamping part generally perpendicular to the second clamping surface;
    the first and second extension portions are positioned adjacent to each other and extending in opposite directions, the first extension portion extending over the second clamping part and the second extension portion extending over the first clamping part, whereby pressures can be applied to the extension portions to separate the first and second clamping surfaces.

2. An optical fiber connector according to claim 1, wherein each clamping part includes a plurality of extension portions, in the form of teeth portions.

3. An optical fiber connector according to claim 2, wherein the teeth portions are spaced apart from each other along at least part of the length of each clamping part.

4. An optical fiber connector according to claim 3, wherein the teeth portions are interdigitated along the lengths of the clamping parts to allow separation of the clamping surfaces a various longitudinal positions of the clamping parts.

5. An optical fiber connector according to claim 4, wherein the teeth portions are arranged such that when the two clamping surfaces are brought together and the connector is closed, the teeth portions of the two clamping parts fit between or adjacent to each other on the same side of the connector body.

6. An optical fiber connector according to claim 1, which further comprises a resilient clamp member arranged to retain the optical fibers in a clamped condition in the connector body.

7. An optical fiber connector according to claim 6, wherein the resilient clamp member is arranged to be retained on the exterior of the connector body.

* * * * *